United States Patent
Park et al.

(10) Patent No.: US 11,267,364 B2
(45) Date of Patent: Mar. 8, 2022

(54) SOC CONTROL METHOD AND APPARATUS FOR IMPROVING FUEL EFFICIENCY OF HYBRID VEHICLE

(71) Applicants: Hyundai Motor Company, Seoul (KR); Kia Motors Corporation, Seoul (KR)

(72) Inventors: Il Kwon Park, Seoul (KR); In Eok Cho, Incheon (KR); Jang Hyo Lee, Hwaseong-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 80 days.

(21) Appl. No.: 16/679,034

(22) Filed: Nov. 8, 2019

(65) Prior Publication Data
US 2020/0339007 A1    Oct. 29, 2020

(30) Foreign Application Priority Data
Apr. 24, 2019    (KR) ........................ 10-2019-0047815

(51) Int. Cl.
*B60L 58/13*    (2019.01)
*B60W 20/13*    (2016.01)

(52) U.S. Cl.
CPC ............. *B60L 58/13* (2019.02); *B60W 20/13* (2016.01); *B60W 2510/083* (2013.01); *B60W 2510/244* (2013.01)

(58) Field of Classification Search
CPC .......... B60L 50/61; B60L 50/62; B60L 58/13; B60W 20/13; B60W 20/40; B60W 2510/244; Y02T 10/6291
See application file for complete search history.

(56) References Cited

U.S. PATENT DOCUMENTS

| | | | |
|---|---|---|---|
| 6,333,620 B1 * | 12/2001 | Schmitz | B60L 50/61 320/132 |
| 2008/0122228 A1 * | 5/2008 | Liu | B60L 1/003 290/40 C |
| 2011/0166733 A1 * | 7/2011 | Yu | B60W 50/082 701/22 |

(Continued)

FOREIGN PATENT DOCUMENTS

| | | | |
|---|---|---|---|
| JP | 2005295617 A | * | 10/2005 |
| JP | 2007045210 A | * | 2/2007 |

(Continued)

OTHER PUBLICATIONS

EPO machine translation of JP 2010-195350 (original JP document published Sep. 9, 2010) (Year: 2010).*

(Continued)

*Primary Examiner* — David A Testardi
(74) *Attorney, Agent, or Firm* — Morgan, Lewis & Bockius LLP (57) ABSTRACT

A state of charge (SOC) control method for improving fuel efficiency of a hybrid vehicle may include monitoring an SOC of a battery of the vehicle, determining, by a controller, a change rate in SOC reduction based on the monitored SOC, and performing, by the controller, SOC anti-reduction control based on the determined change rate in the SOC reduction.

9 Claims, 4 Drawing Sheets

(56) References Cited

U.S. PATENT DOCUMENTS

| | | | | |
|---|---|---|---|---|
| 2011/0202223 | A1* | 8/2011 | Nefcy | B60K 6/445 |
| | | | | 701/22 |
| 2012/0016547 | A1* | 1/2012 | Aridome | B60L 50/61 |
| | | | | 701/22 |
| 2012/0197468 | A1* | 8/2012 | Frederick | B60W 10/06 |
| | | | | 701/22 |
| 2013/0274982 | A1* | 10/2013 | Tagami | B60L 58/15 |
| | | | | 701/22 |
| 2013/0293007 | A1* | 11/2013 | Tagami | B60L 53/14 |
| | | | | 307/10.1 |
| 2014/0013722 | A1* | 1/2014 | Pitcel | A01D 69/025 |
| | | | | 56/10.6 |
| 2015/0239460 | A1* | 8/2015 | Manickaraj | B60W 20/12 |
| | | | | 701/22 |
| 2015/0291149 | A1* | 10/2015 | Kitabatake | B60K 6/445 |
| | | | | 701/22 |
| 2015/0298555 | A1* | 10/2015 | Bennett | B60L 1/14 |
| | | | | 701/22 |
| 2016/0257298 | A1* | 9/2016 | Kim | B60W 10/08 |
| 2016/0297424 | A1* | 10/2016 | Park | F01N 3/006 |
| 2017/0057485 | A1* | 3/2017 | Choi | B60W 10/08 |
| 2018/0029589 | A1* | 2/2018 | Dextreit | B60W 50/0097 |
| 2018/0050682 | A1* | 2/2018 | Ahn | B60K 6/48 |
| 2018/0111598 | A1* | 4/2018 | Jeong | B60W 50/0097 |
| 2019/0105993 | A1* | 4/2019 | Fujiyoshi | B60L 53/16 |
| 2019/0248359 | A1* | 8/2019 | Miller | B60K 6/46 |
| 2019/0283730 | A1* | 9/2019 | Ota | B60W 10/26 |
| 2020/0001858 | A1* | 1/2020 | Bennett | F01N 3/006 |

FOREIGN PATENT DOCUMENTS

| | | | | |
|---|---|---|---|---|
| JP | 2008279970 | A | * | 11/2008 |
| JP | 2010195350 | A | * | 9/2010 |
| JP | 2012224220 | A | * | 11/2012 |
| JP | 2012254763 | A | * | 12/2012 |
| JP | 2013086523 | A | * | 5/2013 |
| JP | 2014080163 | A | * | 5/2014 |

OTHER PUBLICATIONS

JPO machine translation of JP 2010-195350 (original JP document published Sep. 9, 2010) (Year: 2010).*

* cited by examiner

SOC CONTROL METHOD AND APPARATUS FOR IMPROVING FUEL EFFICIENCY OF HYBRID VEHICLE

The present application claims priority to Korean Patent Application No. 10-2019-0047815, filed on Apr. 24, 2019, the entire contents of which is incorporated herein for all purposes by this reference.

BACKGROUND OF THE INVENTION

Field of the Invention

The present invention relates to a state of charge (SOC) control method and apparatus of improving the fuel efficiency of a hybrid vehicle.

Description of Related Art

In general, a hybrid electric vehicle (HEV) refers to a vehicle that utilizes two power sources, in most cases an engine and an electric motor. An HEV has excellent fuel efficiency and engine performance compared with a vehicle including only an internal combustion engine and is also advantageous for lowering exhaust gas, and thus has been actively developed recently.

In such a hybrid vehicle, when the use of an electric motor is increased, the state of charge (SOC) value of a battery is lowered and the vehicle enters a battery charging mode for charging the battery when stopped to charge the battery. Accordingly, the fuel efficiency of the hybrid vehicle is lowered and the performance of the vehicle is also degraded. Based on a method of managing an SOC of a battery, the time during which a vehicle is in a battery charging mode may be minimized to improve the fuel efficiency of the vehicle and also to prevent the performance of the vehicle from being degraded.

Figure 1:
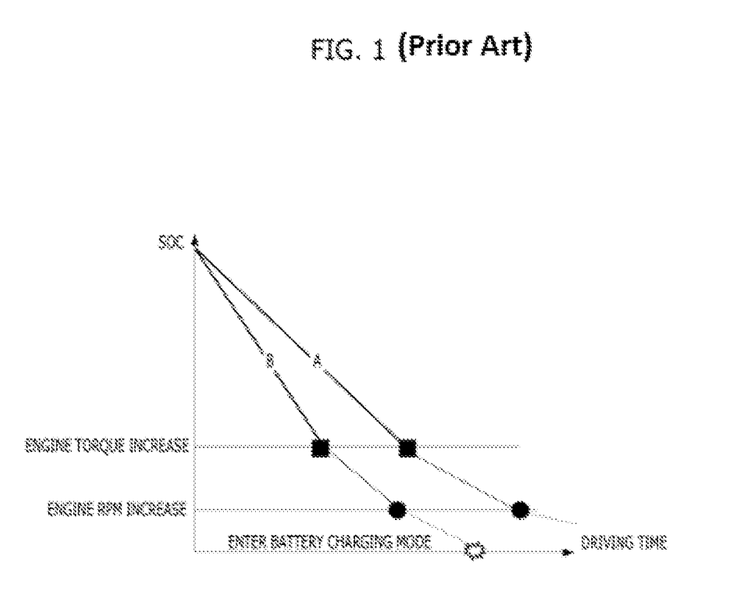
FIG. 1 is a diagram showing an example of conventional state of charge (SOC) anti-reduction control.

FIG. 1 is a diagram showing an example of conventional SOC anti-reduction control.

In the graph shown in FIG. 1, the horizontal axis indicates a battery SOC and the vertical axis indicates a driving time.

Referring to FIG. 1, in a driving situation A, in which the battery SOC is not rapidly lowered while driving of a vehicle, an engine torque increase control and engine revolutions-per-minute (RPM) increase control for SOC anti-reduction control may be performed. That is, SOC anti-reduction control is performed by performing engine torque increase control when the battery SOC of the vehicle is equal to or less than a predetermined SOC, and then performing engine RPM increase control to prevent entry into a battery charging mode when the SOC is further lowered. Accordingly, the vehicle may be prevented from entering the battery charging mode due to a reduction in an SOC.

However, in a driving situation B, in which the battery SOC is rapidly lowered while driving of the vehicle, even if SOC anti-reduction control is performed to prevent entry into a battery charging mode, the vehicle enters the battery charging mode, and thus there is a problem in terms of reduced fuel efficiency of the vehicle and degraded vehicle performance.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a state of charge (SOC) control method and apparatus of improving the fuel efficiency of a hybrid vehicle that substantially obviate one or more problems due to limitations and disadvantages of the related art.

Various aspects of the present invention are directed to providing an SOC control method and apparatus of improving the fuel efficiency of a hybrid vehicle.

Additional advantages, objects, and features of the present invention will be set forth in part in the description which follows and in part will become apparent to those having ordinary skill in the art upon examination of the following or may be learned from practice of the present invention. The objectives and other advantages of the present invention may be realized and attained by the structure particularly pointed out in the written description and claims hereof as well as the appended drawings.

To achieve these objects and other advantages and in accordance with various aspects of the present invention, as embodied and broadly described herein, a state of charge (SOC) control method for improving fuel efficiency of a hybrid vehicle includes monitoring an SOC of a battery of the vehicle, determining, by a controller, a change rate in SOC reduction based on the monitored SOC, and performing, by the controller, SOC anti-reduction control based on the determined change rate in the SOC reduction.

In various exemplary embodiments of the present invention, a state of charge (SOC) control apparatus of improving fuel efficiency of a hybrid vehicle includes a controller configured to receive information on a monitored SOC from a battery of the vehicle and to control an engine of the vehicle, wherein the controller is configured to determine a change rate in SOC reduction based on the monitored SOC and performs SOC anti-reduction control based on the determined change rate in the SOC reduction.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The accompanying drawings, which are included to provide a further understanding of the present invention and are incorporated in and constitute a portion of this application, illustrate embodiment(s) of the present invention and together with the description serve to explain the principle of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Reference will now be made in detail to apparatuses and various methods according to the exemplary embodiments of the present invention, examples of which are illustrated in the accompanying drawings. The suffixes "module" and "unit" of elements herein are used for convenience of description and thus may be used interchangeably, and do not have any distinguishable meanings or functions.

In the description of exemplary embodiments of the present invention, it will be understood that, when an element is referred to as being "on" or "under" or "before" or "after" another element, the element may be directly adjacent to the other element, or intervening elements may also be present.

It will be understood that, although the terms "first", "second", "A", "B", "(a)", "(b)", etc. may be used herein to describe various elements of the present invention, these terms are only used to distinguish one element from another element, and the essential order or sequence of the corresponding elements is not limited by these terms. It will be understood that when one element is referred to as being "connected to", "coupled to", or "accessing" another element, the one element may be "connected to", "coupled to", or "access" another element via a further element, or the one element may be directly connected to or directly access the other element.

The terms "comprises", "includes", and "has" when used herein should be interpreted not to exclude other elements but to further include such other elements since the corresponding elements may be included unless mentioned otherwise. All terms including technical or scientific terms have the same meanings as understood by a person having ordinary skill in the art to which an exemplary embodiment of the present invention pertains unless mentioned otherwise. Generally used terms, such as terms defined in a dictionary, may be interpreted to coincide with meanings in the related art from the context. Unless differently defined in an exemplary embodiment of the present invention, such terms may not be interpreted in an ideal or excessively formal manner.

Prior to a description of a state of charge (SOC) control method for improving the fuel efficiency of a hybrid vehicle according to an exemplary embodiment of the present invention, the configuration and control system of the hybrid vehicle applicable to the exemplary embodiments will be described.

Figure 2:
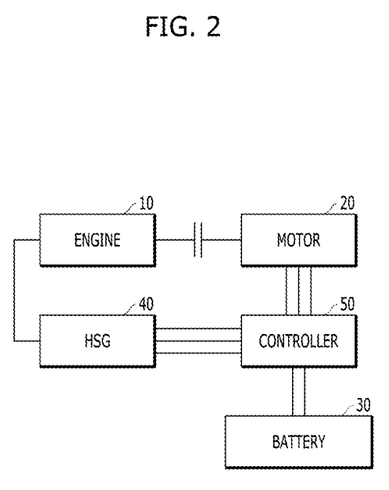
FIG. 2 is a block diagram of a vehicle according to an exemplary embodiment of the present invention.

FIG. 2 is a block diagram of a vehicle according to an exemplary embodiment of the present invention.

Referring to FIG. 2, a hybrid vehicle may include an engine 10, a motor 20, a battery 30, a hybrid starter generator (HSG) 40, a controller 50, and the like.

The engine 10 may burn fuel to generate power.

The motor 20 may assist the power of the engine 10 and, simultaneously, may be operated as a generator to generate electrical energy during braking. The electrical energy generated by the motor 20 may be stored in the battery 30. The motor 20 may have a plurality of motor characteristics according to motor driving control. According to each characteristic of the motor 20, the acceleration performance and fuel efficiency of the hybrid vehicle may be determined.

The battery 30 may be connected to be charged and recharged, and battery charging may be performed during the generation of electricity.

The starter generator motor 40 functions as a starter motor when the engine 10 is turned on and functions as a generator after the engine 10 is turned on or when rotational energy is recovered when the engine is off, and thus the starter generator motor 40 may also be referred to as a hybrid starter generator (HSG) and, as necessary, may be referred to as an auxiliary motor.

The controller 50 may include a hybrid control unit (HCU) for control of the overall operation of a hybrid vehicle, an engine controller for control of operation of the engine 10, a motor control unit (MCU) for control of operation of the motor 20, and a battery control unit (BCU) for control and management of a battery.

Here, the engine controller may also be referred to as an engine management system (EMS). The battery controller may also be referred to as a battery management system (BMS).

Each controller may be connected to a hybrid controller unit (HCU), which is a high-level controller for overall control of a mode conversion operation, and may provide battery SOC information and information for engine torque and an engine RPM increase control depending on a hybrid controller, or may perform an operation according to a control signal. Needless to say, it will be obvious to one of ordinary skill in the art that the aforementioned relationship between the controllers and functions/divisions of the controllers are exemplary, and thus are not limited to the terms. For example, the controller 50 may be embodied by allowing any one of other controllers to replace and provide a corresponding function, or two or more of other controllers may distribute and provide the corresponding function.

The controller 50 may transmit a control signal for engine torque and RPM control to the engine controller through the hybrid controller unit (HCU).

In more detail, the controller 50 may receive information on a battery SOC of the vehicle. The controller 50 may determine a change rate in SOC reduction. As a detailed determination method, the change rate in the SOC reduction may be a value obtained by dividing SOC variation for a predetermined section based on battery SOC consumption by a predetermined time.

Accordingly, the controller 50 may monitor the battery SOC. The monitoring may be performed at ordinary times, or may be performed with a predetermined period, but the present invention is not limited thereto.

The controller 50 may determine a change rate in SOC reduction based on the monitored battery SOC. In the instant case, the change rate in the SOC reduction may be a value obtained by dividing SOC variation for a predetermined section by a predetermined time.

The controller 50 may perform SOC anti-reduction control based on the determined change rate in the SOC reduction. In the instant case, the SOC anti-reduction control may include engine torque increase control and engine revolutions-per-minute (RPM) increase control. Accordingly, the SOC anti-reduction control may prevent the battery SOC of the vehicle from being lowered to be equal to or less than a preset value to prevent the vehicle from entering the battery charging mode.

The controller 50 may perform engine torque increase control. To the present end, the controller 50 may determine whether the change rate in the SOC reduction is equal to or greater than a preset value. Accordingly, the controller 50 may perform engine torque increase control when the change rate in the SOC reduction is equal to or greater than a preset value. That is, an engine torque increase control may vary a battery SOC for performing engine torque increase control based on a preset look-up table.

The controller 50 may perform engine RPM increase control. To the present end, the controller 50 may determine whether the change rate in the SOC reduction is equal to or greater than a preset value after engine torque increase control. Accordingly, when the change rate in the SOC reduction is equal to or greater than the preset value, the controller 50 may perform engine RPM increase control. That is, engine RPM increase control may vary a battery SOC for performing engine RPM increase control based on a preset look-up table. In the instant case, the SOC for performing engine RPM increase control may be lower than an SOC for performing engine torque increase control.

The controller 50 may perform other SOC anti-reduction control depending on the change rate in the SOC reduction. To the present end, the controller 50 may determine whether the change rate in the SOC reduction is equal to or greater than a preset value after engine RPM increase control. Accordingly, when the change rate in the SOC reduction is equal to or greater than the preset value, the controller 50 may perform other SOC anti-reduction control. That is, other SOC anti-reduction control may vary a battery SOC for performing engine RPM increase control based on a preset look-up table. In the instant case, an SOC for performing the other SOC anti-reduction control may be lower than an SOC for performing engine RPM increase control.

Figure 3:
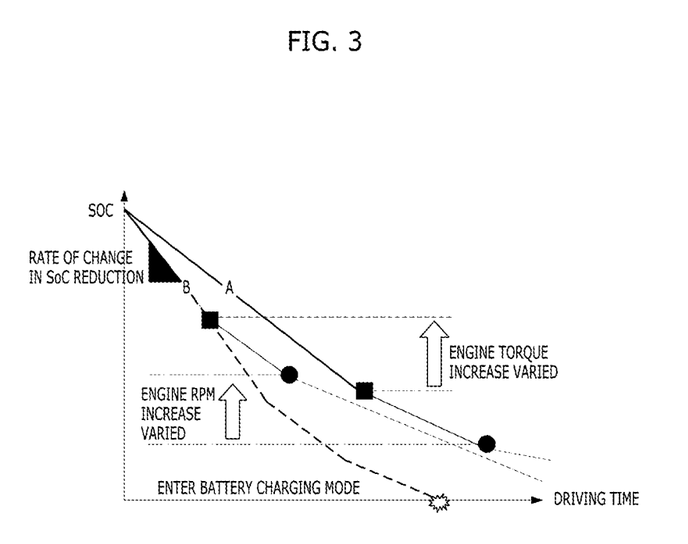
FIG. 3 is a diagram showing an example of SOC anti-reduction control according to an exemplary embodiment of the present invention.

The relationship between driving time and the battery SOC of a vehicle according to SOC anti-reduction control is illustrated in FIG. 3.

FIG. 3 is a diagram showing an example of SOC anti-reduction control according to an exemplary embodiment of the present invention.

In the graph shown in FIG. 3, a horizontal axis indicates a battery SOC and a perpendicular axis indicates a driving time.

FIG. 3 shows an SOC plot A of a driving situation in which the battery SOC is not rapidly lowered while driving of a vehicle and an SOC plot B of a driving situation in which the battery SOC is rapidly lowered while driving of a vehicle.

As shown in FIG. 3, in the driving situation B in which the battery SOC is rapidly lowered while driving of the vehicle, the battery SOC may be monitored in real time, and the controller 50 may determine a rate of battery SOC reduction based on the monitored SOC.

When the change rate in the SOC reduction is equal to or greater than a preset value, the controller 50 may vary an SOC for performing engine torque increase control when a battery SOC is equal to or less than a first SOC. In the instant case, a battery SOC in the driving situation B, in which the battery SOC is rapidly lowered while driving of the vehicle, may be higher than an SOC at a time point of engine torque increase control in the SOC plot A of the driving situation in which the battery SOC is not rapidly lowered. Accordingly, the time point when engine torque increase control is performed in the driving situation B, in which the battery SOC is rapidly lowered while driving of the vehicle, may be earlier than the time point when engine torque increase control is performed in the SOC plot A of the driving situation in which the battery SOC is not rapidly lowered.

After engine torque increase control, if the change rate in the SOC reduction is equal to or greater than a preset value, the controller 50 may perform engine RPM increase control. In the instant case, a battery SOC of the driving situation B in which the battery SOC is rapidly lowered while driving of the vehicle may be higher than a battery SOC at a time point of engine RPM increase control of the SOC plot A of a driving situation in which the battery SOC is not rapidly lowered.

Accordingly, a time point at which engine RPM increase control is performed in the driving situation B, in which the battery SOC is rapidly lowered while driving of the vehicle, may be earlier than a time point at which engine torque RPM control is performed in the SOC plot A of a driving situation in which the battery SOC is not rapidly lowered.

Accordingly, the SOC anti-reduction control may be performed by performing engine torque increase control in a response to the battery SOC and then performing engine RPM increase. Accordingly, a battery charging mode may be prevented by varying the time point of SOC anti-reduction control, improving the fuel efficiency of a vehicle.

Figure 4:
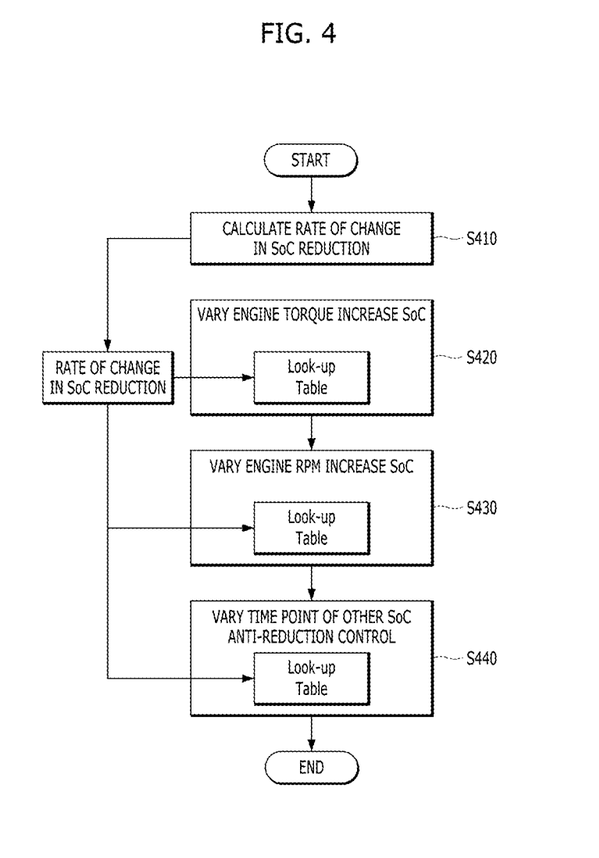
FIG. 4 is a flowchart of SOC anti-reduction control according to an exemplary embodiment of the present invention.

FIG. 4 is a flowchart of SOC anti-reduction control according to an exemplary embodiment of the present invention.

Referring to FIG. 4, a battery SOC may be lowered along with the operation of a vehicle and may be monitored in real time, and the controller 50 may receive the monitored battery SOC information and may determine a change rate in SOC reduction based on the received information (S410).

After operation S410, the controller 50 may perform engine torque increase control based on the determined change rate in the SOC reduction. In the instant case, when the change rate in the SOC reduction is equal to or greater than a preset value, the controller 50 may vary a battery SOC for performing engine torque increase control based on a preset look-up table (S420).

After operation S420, the controller 50 may perform engine RPM increase control based on the determined change rate in the SOC reduction. In the instant case, when the change rate in the SOC reduction is equal to or greater than the preset value, the controller 50 may vary a battery SOC for performing engine RPM increase control based on a look-up table (S430).

After operation S430, the controller 50 may perform other SOC anti-reduction control based on the determined change rate in the SOC reduction. In the instant case, when the change rate in the SOC reduction is equal to or greater than a preset value, the controller 50 may vary a battery SOC for performing other SOC anti-reduction control based on a look-up table (S440).

Through the aforementioned method, SOC variation in the case of SOC reduction may be monitored in real time and a time point of SOC anti-reduction control may be varied to minimize entry into a battery charging mode, improving the fuel efficiency of a vehicle and enhancing vehicle performance.

An SOC control method and apparatus of improving the fuel efficiency of a hybrid vehicle may minimize entry into a battery charging mode via battery SOC anti-reduction control, advantageously improving the fuel efficiency of a vehicle and maintaining the performance of the vehicle.

It will be appreciated by persons skilled in the art that the effects that could be achieved with the present invention are not limited to what has been particularly described hereinabove, and other advantages of the present invention will be more clearly understood from the detailed description.

The aforementioned method according to an exemplary embodiment of the present invention may also be embodied as computer readable code on a computer readable recording medium. Examples of the computer readable recording medium include read-only memory (ROM), random-access memory (RAM), CD-ROMs, magnetic tapes, floppy disks, optical data storage devices, etc. The computer readable recording medium may also be distributed over network-coupled computer systems so that the computer readable code is stored and executed in a distributed fashion. Also, functional programs, code, and code segments for accomplishing the aforementioned method may be easily constructed by programmers skilled in the art to which an exemplary embodiment of the present invention pertains.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A state of charge (SOC) control method of improving fuel efficiency of a vehicle, the method comprising:
    monitoring an SOC of a battery of the vehicle;
    determining, by a controller, a change rate in SOC reduction based on the monitored SOC; and
    performing, by the controller, SOC anti-reduction control by controlling an engine based on the determined change rate in the SOC reduction, when preventing the SOC of the battery of the vehicle from being lowered to be equal to or less than a first predetermined value,
    wherein the change rate in the SOC reduction is a value obtained by dividing SOC variation for a predetermined section by a predetermined time,
    wherein the performing the SOC anti-reduction control based on the determined change rate in the SOC reduction includes performing engine torque increase control based on a first determined change rate in the SOC reduction and performing engine revolutions-per-minute (RPM) increase control based on a second determined change rate in the SOC reduction,
    wherein the performing the engine RPM increase control includes determining when the second determined change rate in the SOC reduction is equal to or greater than a preset value after the engine torque increase control, and
    wherein the performing the engine RPM increase control is based on a battery SOC that is based on a predetermined look-up table, upon determining that the second determined change rate in the SOC reduction is equal to or greater than the preset value.

2. The method of claim 1, wherein the performing the engine torque increase control includes determining when the first determined change rate in the SOC reduction is equal to or greater than the preset value.

3. The method of claim 2, further including:
    performing the engine torque increase control based on a predetermined look-up table upon determining that the first determined change rate in the SOC reduction is equal to or greater than the preset value.

4. The method of claim 1, wherein the SOC that performing the engine RPM increase control is based on is lower than an SOC for performing the engine torque increase control.

5. A non-transitory computer readable recording medium having recorded thereon a program for executing an SOC control method of improving fuel efficiency of a vehicle, the method comprising:
    monitoring an SOC of a battery of the vehicle;
    determining, by a controller, a change rate in SOC reduction based on the monitored SOC; and
    performing, by the controller, SOC anti-reduction control by controlling an engine based on the determined change rate in the SOC reduction, when preventing the SOC of the battery of the vehicle from being lowered to be equal to or less than a first predetermined value,
    wherein the change rate in the SOC reduction is a value obtained by dividing SOC variation for a predetermined section by a predetermined time,
    wherein the performing the SOC anti-reduction control based on the determined change rate in the SOC reduction includes performing engine torque increase control based on a first determined change rate in the SOC reduction and performing engine revolutions-per-minute (RPM) increase control based on a second determined change rate in the SOC reduction,
    wherein the performing the engine RPM increase control includes determining when the second determined change rate in the SOC reduction is equal to or greater than a preset value after the engine torque increase control, and
    wherein the performing the engine RPM increase control is based on a battery SOC that is based on a predetermined look-up table, upon determining that the second determined change rate in the SOC reduction is equal to or greater than the preset value.

6. A state of charge (SOC) control apparatus of improving fuel efficiency of a vehicle, the apparatus comprising:
    a controller configured to monitor SOC from a battery of the vehicle and to control an engine of the vehicle,
    wherein the controller is configured to determine a change rate in SOC reduction based on a monitored SOC and is configured to perform SOC anti-reduction control by controlling an engine based on the determined change rate in the SOC reduction, when preventing the SOC of the battery of the vehicle from being lowered to be equal to or less than a first predetermined value, wherein the change rate in the SOC reduction is a value obtained by dividing SOC variation for a predetermined section by a predetermined time, wherein the controller is configured to perform the SOC anti-reduction control including engine torque increase control based on a first determined change rate in the SOC reduction and engine revolutions-per-minute (RPM) increase control based on a second determined change rate in the SOC reduction, wherein the controller is configured to determine when the second determined change rate in the SOC reduction is equal to or greater than a preset value and perform the engine RPM increase control after the engine torque increase control, wherein the controller is configured to perform the engine RPM increase control based on a battery SOC that is based on a predetermined look-up table, upon determining that the second determined change rate in the SOC reduction is equal to or greater than the preset value.

7. The apparatus of claim 6, wherein the controller is configured to determine when the first determined change rate in the SOC reduction is equal to or greater than the preset value.

8. The apparatus of claim 7, wherein the controller is configured to perform the engine torque increase control based on a predetermined look-up table, upon determining that the first determined change rate in the SOC reduction is equal to or greater than the preset value.

9. The apparatus of claim 6, wherein the SOC that performing the engine RPM increase control is based on is lower than an SOC for performing the engine torque increase control.

* * * * *